(12) United States Patent
Gabriele

(10) Patent No.: US 6,322,295 B1
(45) Date of Patent: Nov. 27, 2001

(54) PNEUMATIC APPARATUS AND METHOD FOR TRANSPORTING IRREGULARLY-SHAPED OBJECTS

(76) Inventor: Dino Gabriele, 550 Yale Road, Port Moody, British Columbia (CA), V3H 3K3

( * ) Notice: Subject to any disclaimer, the term of this patent is extended or adjusted under 35 U.S.C. 154(b) by 0 days.

(21) Appl. No.: 09/443,101

(22) Filed: Nov. 18, 1999

(51) Int. Cl.[7] .................................................. B65G 51/20
(52) U.S. Cl. .............................. 406/84; 406/19; 406/50; 406/151; 406/169; 406/177; 406/180
(58) Field of Search .................... 406/19, 50, 151, 406/169, 177, 180, 83, 84

(56) References Cited

U.S. PATENT DOCUMENTS

| | | |
|---|---|---|
| 1,849,119 * | 3/1932 | Stoetzel .............................. 406/180 |
| 3,198,581 * | 8/1965 | Gamberini .............................. 302/2 |
| 3,853,355 | 12/1974 | Buisson . |
| 4,984,939 * | 1/1991 | Foreman et al. ....................... 406/84 |
| 4,993,882 * | 2/1991 | Nishizuka et al. ..................... 406/31 |
| 4,995,765 | 2/1991 | Tokuhiro et al. . |
| 5,299,891 * | 4/1994 | Grosswiller et al. ................. 406/151 |
| 5,846,030 * | 12/1998 | Beard et al. .......................... 406/19 |
| 6,039,510 * | 3/2000 | Greene et al. ......................... 406/21 |
| 6,210,080 * | 4/2001 | Haul et al. .............................. 406/13 |

\* cited by examiner

*Primary Examiner*—Christopher P. Ellis
*Assistant Examiner*—Joe Dillon, Jr.
(74) *Attorney, Agent, or Firm*—Oyen Wiggs Green & Mutala

(57) ABSTRACT

A pneumatic system for transporting irregular objects such as bags filled with recycled cans through a duct in which the object is first accelerated by pneumatic pressure and subsequently decelerated after a sensor triggers the closure of the air outlets as the object approaches the output point of the system.

9 Claims, 4 Drawing Sheets

PNEUMATIC APPARATUS AND METHOD FOR TRANSPORTING IRREGULARLY-SHAPED OBJECTS

TECHNICAL FIELD

The invention relates to the field of transportation of objects by pneumatic tubes or ducts, and more particularly to transportation of large, irregular objects such as bags of recycled material by pneumatic tube.

BACKGROUND ART

Pneumatic tubes or ducts have long been used in the transportation of small, uniform solid objects such as hollow cases or canisters for transporting mail within a building. The use of pneumatic tubes or ducts has also been applied to the transport of bags of rubbish. For example, U.S. Pat. No. 3,853,355 Buisson issued Dec. 10, 1974 discloses a system for discharging rubbish through pneumatic ducts. This system is designed for transporting bags of unsorted household waste in which the bags are heavy and irregular and sometimes leaking sticky substances, so the main problem to be overcome by that system was to provide sufficient momentum to transport the bags of rubbish to the central destruction facility. This was done by having the bag of rubbish travel downwardly, then horizontally and using a secondary fan to first suck air from the tube ahead of the bag and then blow behind the bag. Another pneumatic system for transporting rubbish is disclosed in U.S. Pat. No. 4,995,765 Tokuhiro et al. issued Feb. 26, 1991. Again the units to be transported in this system relate to unsorted household waste which is relatively heavy, and the system involves the containers dropping vertically and then being forced horizontally to the collection area.

Currently, supermarkets collect recycled waste such as aluminum cans which require transportation from the front of the store, where the customers deposit the cans, to the rear of the store where collection vehicles can pick up the materials for recycling. It is undesirable to transport such beverage cans for recycling at ground level through the supermarket at floor level since the materials may leak liquids causing an unsanitary and unsightly situation. Consequently there is a need for a system to transport bags of recycled aluminum cans and the like above the floor level of supermarkets and back down at the rear of the supermarket for collection.

DISCLOSURE OF INVENTION

The present invention provides a method and apparatus for transporting large, irregular objects upwardly, then horizontally, then downwardly. The invention provides an apparatus for pneumatically transporting objects comprising: a) a main duct having an input opening for introducing the object, and an output opening; b) a fan communicating with the main duct through a fan duct for drawing air out of the main duct upstream from the output opening; c) first valve means for selectively opening or closing the output; d) second valve means for selectively opening or closing the communication between the fan duct and the main duct; e) sensing means for sensing when the object passes a selected point in the main duct; and f) control means for opening the communication between the fan duct and the main duct, and closing the first valve means when an object is placed in the input, and subsequently closing the second valve means when the object reaches the designated location in the main duct.

The invention also provides a method of pneumatically transporting irregular-shaped objects comprising: i) providing a) a main duct having an input opening for introducing the object, and an output opening; b) a fan communicating with the main duct through a fan duct for drawing air out of the main duct upstream of the output opening; c) first valve means for selectively opening or closing the output opening; d) second valve means for selectively opening or closing the communication between the fan duct and the main duct; e) sensing means for sensing when the object passes a selected point in the main duct; f) control means for opening the communication between the fan duct and the main duct, and closing the first valve means when an object is placed in the input, and subsequently closing the second valve means when the object reaches the designated location in the main duct; ii) placing an object in the input and closing the input opening; iii) opening the communication between the fan duct and the main duct, and closing the output opening, thereby accelerating the object in the main duct from the input towards the output; iv) closing the second valve means when the sensing means detects that the object has reached the designated location in the main duct, thereby causing the object to decelerate; and v) opening the first valve means to permit the object to exit from the outlet opening of the main duct.

BRIEF DESCRIPTION OF DRAWINGS

In drawings which illustrate a preferred embodiment of the invention.

BEST MODE(S) FOR CARRYING OUT THE INVENTION

Figure 1:
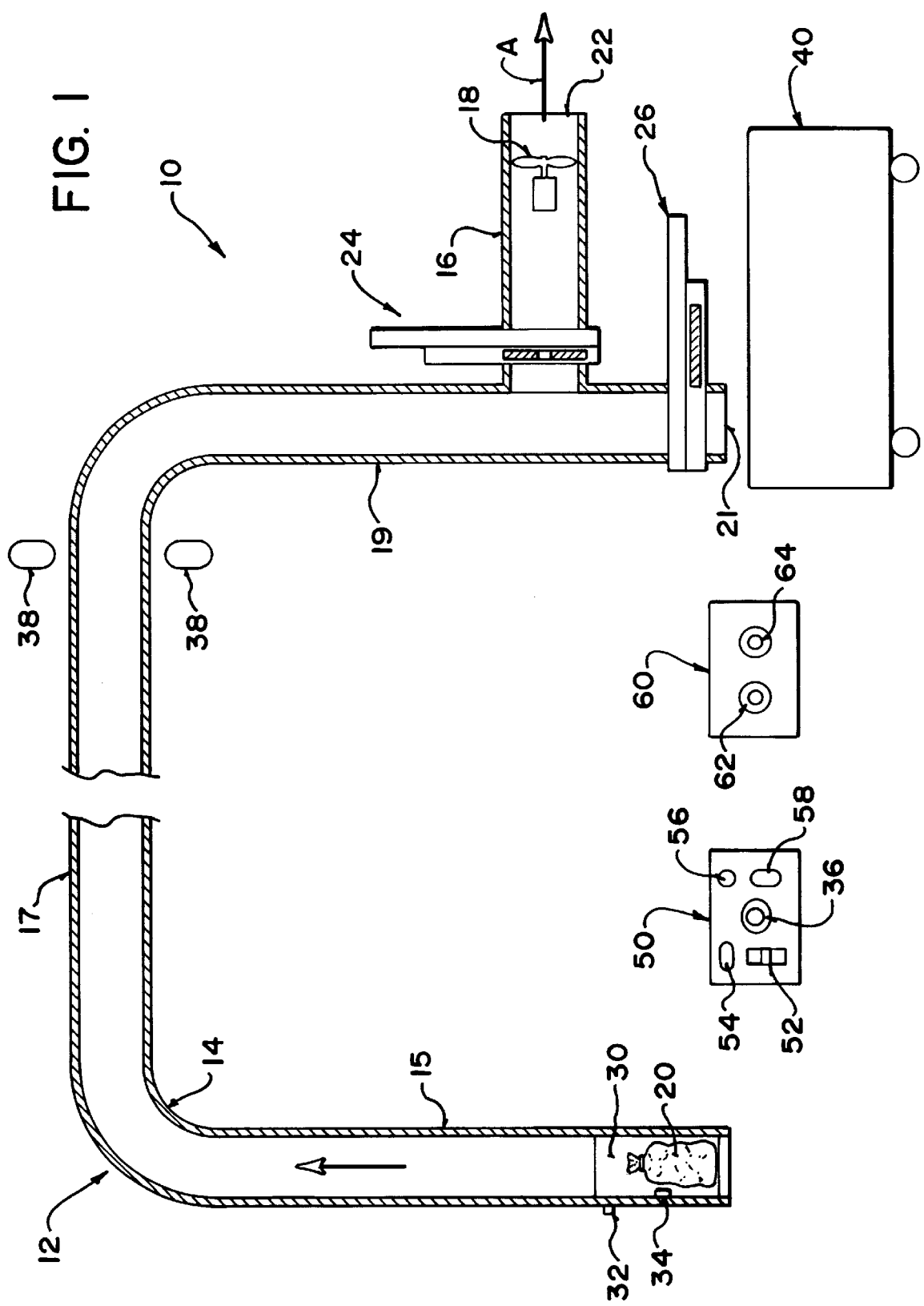
FIG. 1 is a schematic cross-section of the invention with the transported object in an initial position.

With reference to the drawings, the pneumatic transport system of the invention, generally designated by 10, comprises a series of relatively air-tight pneumatic tubes or ducts 12, comprising a main duct 14 and a fan duct 16 in which is mounted fan 18 for blowing air out of the main duct 14 as shown by arrow A. Fan 18 is a large, powerful fan, for example a 15 horsepower Twin City fan model # 222 BAF-SW, which operates continuously as long as the system is switched "on". The end 22 of fan duct 16 opens to the atmosphere. Main duct 14 has a vertical launch section 15, horizontal section 17, vertical end section 19, and outlet opening 21 and has a preferred diameter of 20 inches. An object 20 is to be transported, which will be for example a large, tied plastic (polyethylene) garbage bag, typically 19 inches in diameter when filled, filled with empty aluminum cans for recycling. Such objects are of irregular shape, in that their outer dimensions are not fixed or uniform as would be a typical pneumatic canister which is designed for transport in a pneumatic duct and therefore has an outer dimension conforming to the inner surface of the pneumatic tube. By contrast object 20 has an exterior surface which is undulating and irregular due to the protrusion of empty cans against the flexible surface of the garbage bag. The system will also function with other objects such as cardboard boxes which may be filled with cardboard pieces or other articles for recycling, or miscellaneous empty containers.

Figure 2:
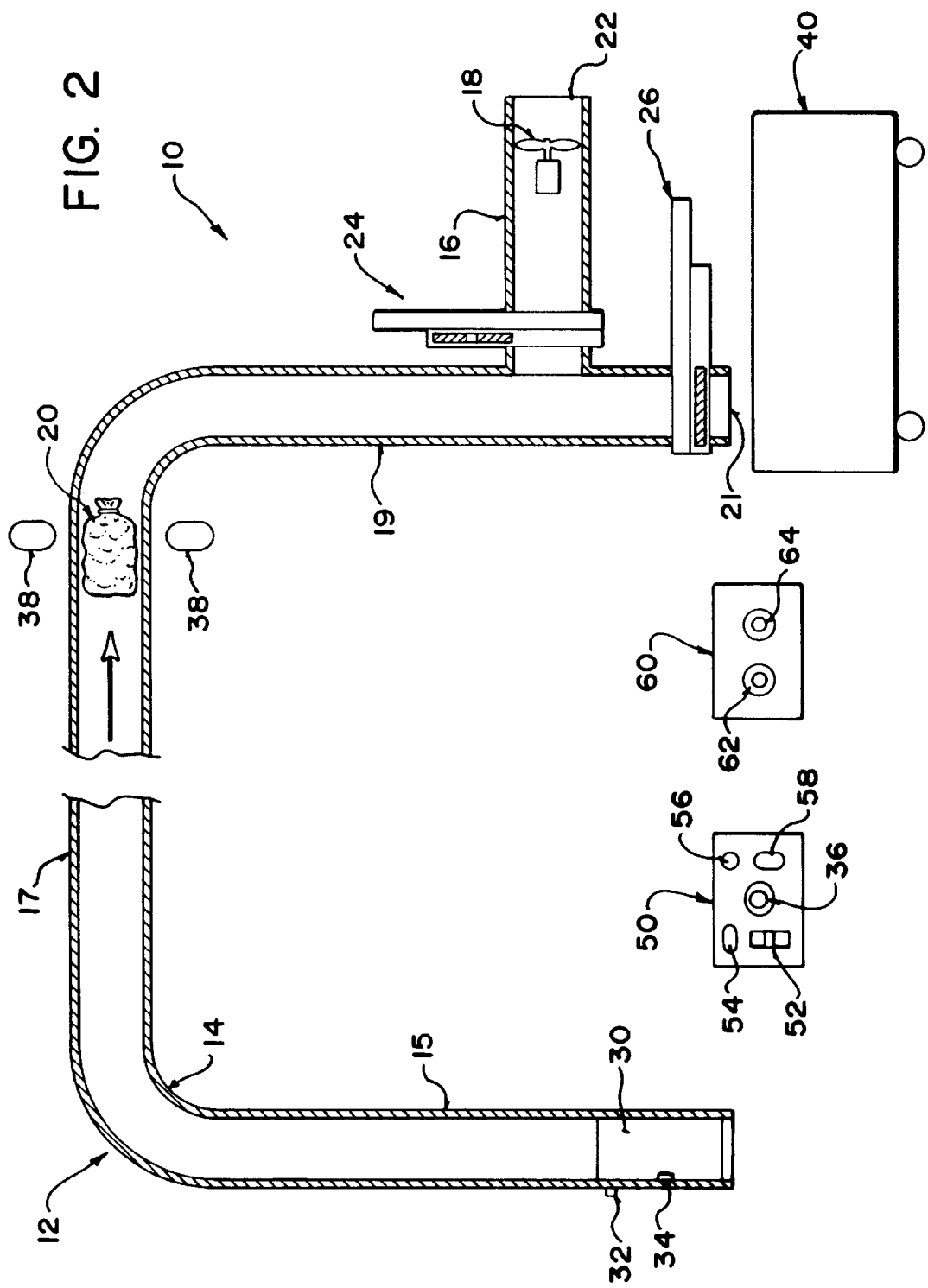
FIG. 2 is a schematic cross-section of the invention with the transported object in an intermediate position.
Figure 3:
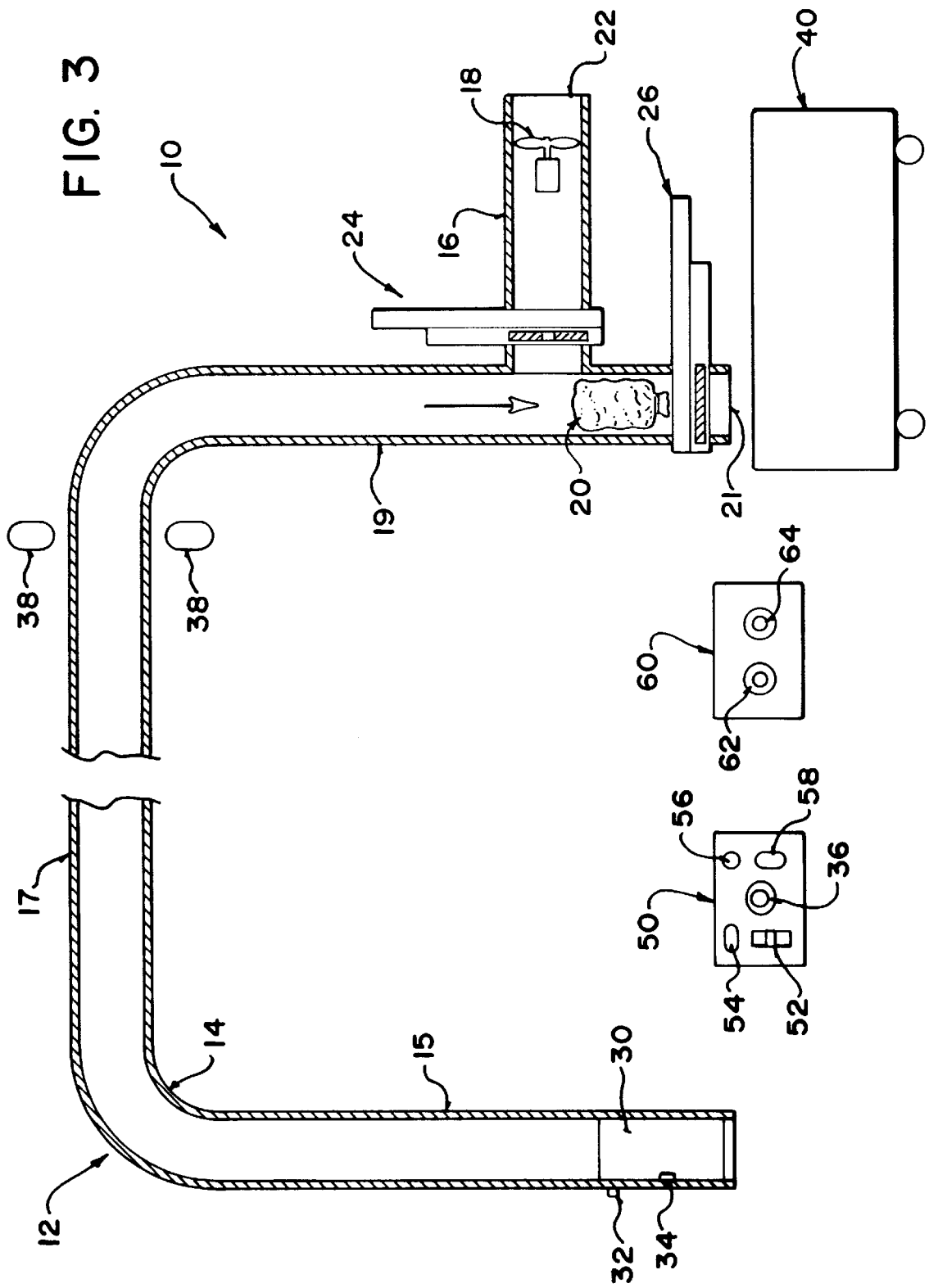
FIG. 3 is a schematic cross-section of the invention with the transported object approaching the waste outlet of the system.

Two valves or air locks 24, 26 operated by pneumatic cylinders operate to open or close the air flow in ducts 14, 16. Initially (FIG. 1), valve 24 is closed, and valve 26 is open. Fan 18 draws a small amount of air through opening 28 (FIG. 4) to facilitate the operation of the fan. In this initial stage therefore there is little or no pneumatic pressure in duct 14. An air tight hinged door 30 permits the object 20 to be placed inside section 15 of duct 14. Door 30 has magnetic sensors 32 to sense when the door is closed and latch 34 to secure the door. Activating launch button 36 causes valve 24 to open and valve 26 to close (FIG. 2). This creates a vacuum in duct 14 and causes object 20 to be launched up section 15 and along section 17, continuously gaining momentum. Sensors 38, which can operate on a light beam being broken, for example photo sensors manufactured by Allen Bradley under model numbers 42EF-E1Q2B-A2 (transmitter) and 42EF-R9RCB-A2 (receiver), but may also be metal sensors or other known motion sensors, sense the passage of object 20 and cause valve 24 to be shut after a preset delay, and valve 26 to be opened, also after a preset delay. It has been found useful to locate the sensors just prior to the vertical section 19 of the main duct 14. Valve 24 will be shut prior to the opening of valve 26 so that the air trapped in the bottom of section 19 becomes compressed and acts as a pillow to slow the descent of object 20 (FIG. 3). Valve 26 can be timed to open shortly before it is reached by object 20, or it can be timed so that object 20 falls onto the valve door 68, which preferably is a steel plate, before opening. When valve 24 opens object 20 falls into compactor 40, or a receptacle from which the object 20 can be transported to a compactor.

Figures 4, 5:
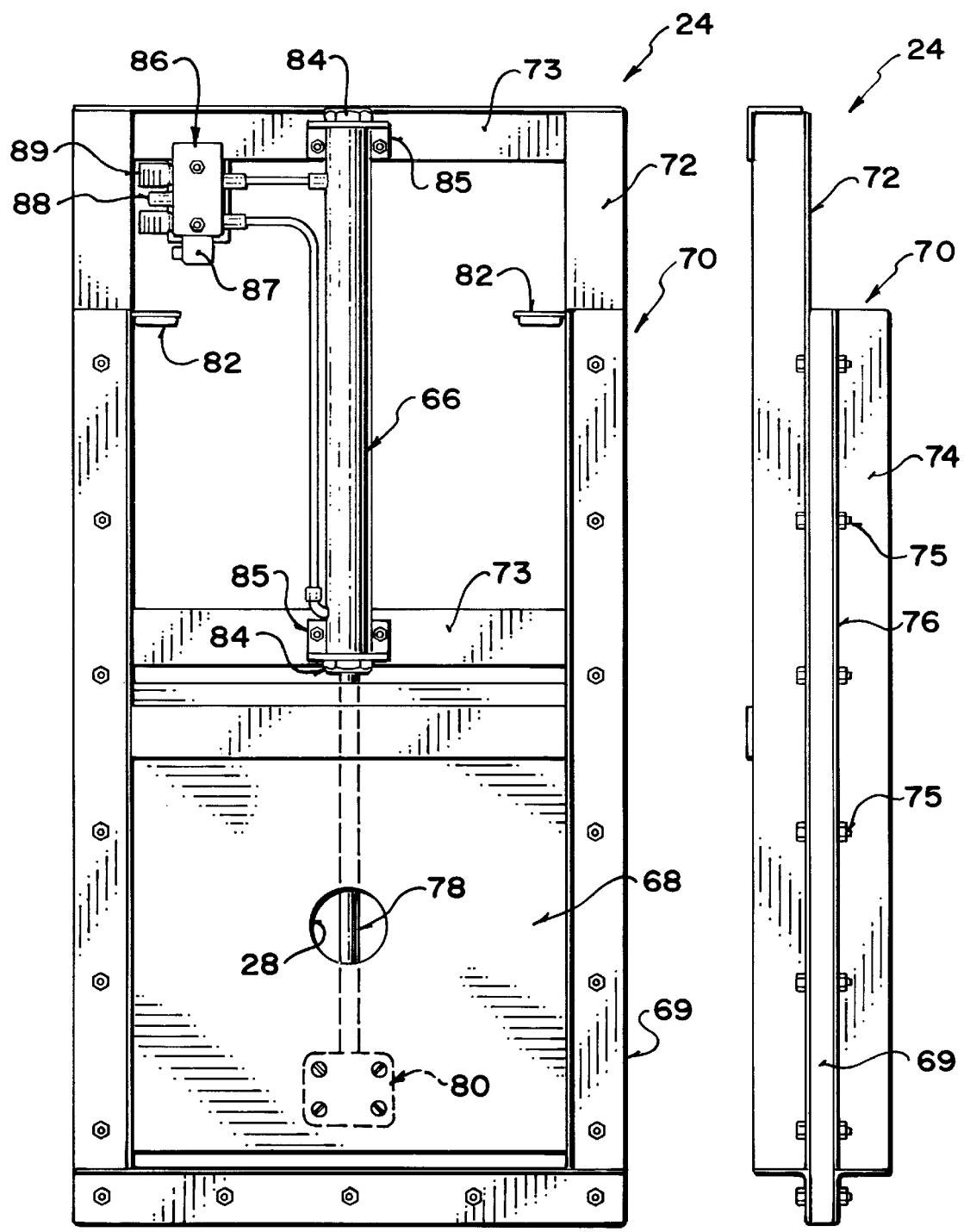
FIG. 4 is a bottom view of a valve arrangement for the invention.
FIG. 5 is a side view of the valve arrangement shown in FIG. 4.

Valves 24, 26 are preferably pneumatically operated sliding panels as illustrated in FIGS. 4 and 5. The valve 24 has a pneumatic piston 66 and a sliding air-tight door 68 held in frame 70 consisting of piston-supporting frame 72 and door-retaining frame 74, which are held together by bolts 75 through flanges 76. Door 68 runs on a TEFLON™ track 69. Piston 66, which is typically a 3 inch piston, drives rod 78 which is attached to door 68 at 80 and is retained on cross-braces 73 in frame 72 by retaining nuts 84 through brackets 85. FIG. 4 shows the door in an almost fully closed position. In an open position the door 68 is drawn back to door stops 82. A solenoid 86 powered by power supply 87 controls the supply of pressurized air to cylinder 66 through air inlet 88 and out discharge muffler 89. With respect to valve 24 in fan duct 16, the door 68 has an air by-pass opening 28 which is not present in valve 26. Valve 26 has a pressure sensor to sense whether a jam has occurred in closing valve 26, causing the valve to reopen and close again in that event.

Control panel 50 is provided to provide a switch 52 and indicator light 54 for system "on", the launch button 36, an indicator light 56 illuminated when the object 20 passes sensor 38, and an emergency button 58 to shut down the fan. A separate control panel 60 is provided for timers 62, 64 which adjust the timing of closure of valves 24, 26 after sensor 38 is triggered.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus which pneumatically transports an object comprising:

a) a main duct having an input opening for introducing said object, and an output opening;
 b) a fan duct for drawing air out of said main duct communicating with said main duct through a fan duct outlet upstream from said output opening;
 c) a fan communicating with said main duct through said fan duct outlet for drawing air out of said main duct upstream from said output opening;
 d) first valve means for selectively opening and closing said output opening;
 e) second valve means for selectively opening and closing said communication between said fan duct and said main duct;
 f) sensing means upstream of said fan duct outlet for sensing when said object passes a predetermined location in said main duct upstream of said fan duct outlet, said sensing means providing a signal to a control means for closing said second valve means when said object reaches said predetermined location in said main duct upstream of said fan duct outlet;
 g) said control means for opening said second valve means, and closing said first valve means upon receipt of a signal that an object has been placed in said input, and subsequently closing said second valve means upon receipt of said signal that said object has reached said predetermined location in said main duct upstream of said fan duct outlet the closure of said first and second valve means decelerating said object.

2. The apparatus of claim 1 wherein said first and second valve means comprises power operated air locks comprising a panel reciprocally movable between an open position and a closed position.

3. The apparatus of claim 1 wherein said panel in said second valve means comprises an opening to permit a reduced passage of air when said second valve is closed.

4. The apparatus of claim 1 wherein said main duct comprises a first vertical section, an intermediate horizontal section and a second vertical section.

5. The apparatus of claim 1 wherein said input opening is in said first vertical section, and said outlet opening is in said second vertical section.

6. The apparatus of claim 5 wherein said sensing means is located upstream from said second vertical section.

7. The apparatus of claim 5 wherein said fan duct communicates with said main duct immediately upstream from said outlet opening in said second vertical section.

8. The apparatus of claim 5 wherein said predetermined location is located immediately upstream from said second vertical section.

9. A method of pneumatically transporting an object comprising:

i) providing
  a) a main duct having an input opening for introducing said object, and an output opening;
  b) a fan duct for drawing air out of said main duct communicating with said main duct through a fan duct outlet upstream from said output opening;
  c) a fan communicating with said main duct through a fan duct for drawing air out of said main duct upstream of said output opening;
  d) first valve means for selectively opening and closing said output opening;
  e) second valve means for selectively opening and closing said communication between said fan duct and said main duct;
  f) sensing means upstream of said fan duct outlet for sensing when said object passes a predetermined location in said main duct upstream of said fan duct outlet;

g) control means for opening said second valve means, and closing said first valve means upon receipt of a signal that an object has been placed in said input, and subsequently closing said second valve means upon receipt of a signal that an object has reached said predetermined location in said main duct;

ii) placing an object in said input opening and closing said input opening;

iii) opening said communication between said fan duct and said main duct, and closing said output opening, thereby accelerating said object in said main duct from said input towards said output;

iv) closing said second valve means when said sensing means detects that said object has reached said predetermined location in said main duct upstream of said fan duct outlet, thereby causing said object to decelerate; and v) opening said first valve means to permit said object to exit from said outlet opening of said main duct.

* * * * *